United States Patent
Ohmi et al.

(10) Patent No.: US 10,012,303 B2
(45) Date of Patent: Jul. 3, 2018

(54) FIBER-REINFORCED RESIN GEAR

(71) Applicant: Enplas Corporation, Saitama (JP)

(72) Inventors: Kenji Ohmi, Saitama (JP); Toru Murakami, Tokyo (JP); Masaya Tsukamoto, Saitama (JP)

(73) Assignee: ENPLAS CORPORATION, Saitama (JP)

(*) Notice: Subject to any disclaimer, the term of this patent is extended or adjusted under 35 U.S.C. 154(b) by 229 days.

(21) Appl. No.: 14/784,068

(22) PCT Filed: Apr. 15, 2014

(86) PCT No.: PCT/JP2014/060714
§ 371 (c)(1),
(2) Date: Oct. 13, 2015

(87) PCT Pub. No.: WO2014/171450
PCT Pub. Date: Oct. 23, 2014

(65) Prior Publication Data
US 2016/0047453 A1 Feb. 18, 2016

(30) Foreign Application Priority Data

Apr. 18, 2013 (JP) ................................. 2013-087115

(51) Int. Cl.
| | |
|---|---|
| *F16H 55/06* | (2006.01) |
| *B29C 45/00* | (2006.01) |

(Continued)

(52) U.S. Cl.
CPC ......... *F16H 55/06* (2013.01); *B29C 45/0005* (2013.01); *C08J 5/043* (2013.01);
(Continued)

(58) Field of Classification Search
CPC ..... F16H 55/06; F16H 55/17; B29C 45/0005; C08J 5/043
See application file for complete search history.

(56) References Cited

U.S. PATENT DOCUMENTS

| | | | |
|---|---|---|---|
| 3,304,164 A * | 2/1967 | Brossard | C03B 37/048 264/165 |
| 3,785,791 A * | 1/1974 | Perry | C03B 37/048 65/488 |

(Continued)

FOREIGN PATENT DOCUMENTS

| | | |
|---|---|---|
| JP | 2006-290062 | 10/2006 |
| JP | 2008-8404 | 1/2008 |

(Continued)

OTHER PUBLICATIONS

International Search Report dated Jul. 22, 2014 in International Application No. PCT/JP2014/060714.

(Continued)

*Primary Examiner* — David M Fenstermacher
(74) *Attorney, Agent, or Firm* — Wenderoth, Lind & Ponack, L.L.P.

(57) ABSTRACT

Provided is a fiber reinforced resin gear whose durability in use under a high temperature is enhanced. A fiber reinforced resin gear is formed by injecting a resin material containing glass wool into the inside of a cavity of a mold. A fiber diameter of the glass wool is scattered in a wide range of 0.1 to 15 μm, and is distributed such that a most frequent value of the fiber diameter appears within a range of 2 to 5 μm, and an average fiber diameter of the glass wool falls within a range of 3 to 5 μm. The fiber reinforced resin gear according to the present invention can enhance durability and abrasion resistance under a high temperature compared to a conventional fiber reinforced resin gear.

10 Claims, 7 Drawing Sheets

(51) Int. Cl.
*C08J 5/04* (2006.01)
*F16H 55/17* (2006.01)
*B29L 15/00* (2006.01)
*B29K 105/12* (2006.01)
*B29K 309/08* (2006.01)
*B29L 31/00* (2006.01)

(52) U.S. Cl.
CPC .......... *F16H 55/17* (2013.01); *B29K 2105/12* (2013.01); *B29K 2309/08* (2013.01); *B29L 2015/00* (2013.01); *B29L 2031/775* (2013.01); *F16H 2055/065* (2013.01)

(56) References Cited

U.S. PATENT DOCUMENTS

| | | | | |
|---|---|---|---|---|
| 4,636,234 | A | * | 1/1987 | Huey .................. C03B 37/022 264/177.1 |
| 6,862,901 | B1 | | 3/2005 | Otaki et al. |
| 9,493,612 | B2 | * | 11/2016 | Block .................. C08G 69/48 |
| 9,725,564 | B2 | * | 8/2017 | Block .................. C08J 5/08 |
| 2007/0293607 | A1 | | 12/2007 | Arakawa et al. |
| 2012/0252932 | A1 | | 10/2012 | Sano et al. |

FOREIGN PATENT DOCUMENTS

| | | |
|---|---|---|
| JP | 2009-155172 | 7/2009 |
| JP | 2011-183638 | 9/2011 |
| WO | 01/19741 | 3/2001 |
| WO | 2006/054774 | 5/2006 |

OTHER PUBLICATIONS

Chinese Examination Report dated Feb. 28, 2018 in corresponding Chinese patent application No. 201480020912.3, with English translation.

\* cited by examiner

FIBER-REINFORCED RESIN GEAR

TECHNICAL FIELD

The present invention relates to a fiber reinforced resin gear containing glass wool.

BACKGROUND ART

Conventionally, there has been developed a fiber reinforced resin gear containing glass fibers each having a fixed fiber diameter. The fiber reinforced resin gear has a higher strength than a gear formed using only a resin material and is more light-weighted than a metal-made gear and hence, the fiber reinforced resin gear has been popularly used as power transmission parts of automobiles which aim at the enhancement of fuel consumption and various machines which aim at the reduction of weight thereof (see PTL 1).

CITATION LIST

Patent Literature

PTL JP-A-2008-8404

SUMMARY OF INVENTION

Technical Problem

However, recently, in an automobile industry where fiber reinforced resin gears are used, there has been a demand for the enhancement of abrasion resistance of fiber reinforced resin gears it use under a high temperature environment (under an environment of 130° C.).

In view of the above-mentioned circumstances, it an object of the present invention to provide a fiber reinforced resin gear which can enhance abrasion resistance in use under a high temperature environment.

Solution to Problem

The present invention is directed to a fiber reinforced resin gear formed by injecting a resin material containing glass wool into the inside of a cavity of a mold. In the present invention, a fiber diameter of the glass wool is scattered in a wide range of 0.1 to 1.5 μm, and is distributed such that a most frequent value of the fiber diameter appears within a range of 2 to 5 μm, and an average fiber diameter falls within a range of 3 to 5 μm.

Advantageous Effects of Invention

According to the fiber reinforced resin gear of the present invention, abrasion resistance under a high temperature environment can be enhanced compared to a conventional fiber reinforced resin gear.

BRIEF DESCRIPTION OF DRAWINGS

FIGS. 1(a) and 1(b) are views showing a fiber reinforced resin gear according to an embodiment of the present invention, wherein

DESCRIPTION OF EMBODIMENTS

An embodiment of the present invention is explained with reference to drawings hereinafter.

Explanation of Fiber Reinforced Resin Gear According to this Embodiment

Figure 1:
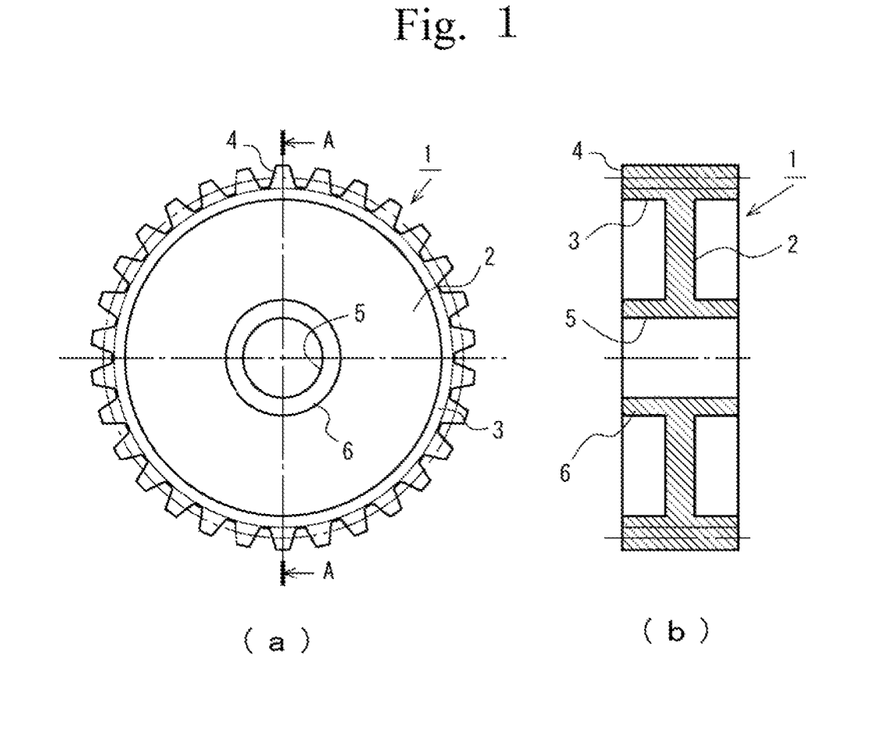
FIG. 1(a) is a front view of the fiber reinforced resin gear.
FIG. 1(b) is a cross-sectional view of the fiber reinforced resin gear taken along it line A-A in FIG. 1(a).

FIGS. 1(a) and 1(b) are views showing a fiber reinforced resin gear according to this embodiment. The fiber reinforced resin gear 1 is formed by molding injecting a resin material (for example, a thermoplastic resin such as polyamide (PA), polyacetal (POM), polyphenylene sulfide (PPS), polyphthalamide (PPA), polyetherimide, polyethersulfone, polyketone, polyetheretherketone, polysulfone, polyphenylene ether, polymide, polyamide-imide, phenoxy and the like, preferably, PA, POM, PPS, PPA or the like)) which contains glass wool into a cavity of a mold. In the fiber reinforced resin gear 1, a rim 3 is formed on an outer peripheral side of a disc-shaped web 2, while a plurality of teeth 4 (only one tooth 4 shown in FIGS. 1(a) and (b)) is formed on an outer peripheral side of the rim 3, and a shaft fitting portion 6 provided with a shaft hole 5 is formed on a center portion of the web 2.

Glass wool is produced by forming C glass or E glass into glass fibers by a centrifugal method and/or a flame method or the like. Glass wool is used in which a fiber diameter is widely scattered within a range of 0.1 to 15 μm, preferably, within a range of 0.5 to 1.1 μm, is distributed such that a most frequent value of the fiber diameter appears within a range of 2 to 5 μm, and an average fiber diameter falls within a range of 3 to 5 μm, preferably within a range of 4 to 5 μm. The glass wool is generally referred to as short fibers, and differs from chopped strand, milled fibers or the like which are formed from long fibers.

Comparison Between Test Products and Conventional Products

Next, results of an endurance test and an abrasion test of test products of a fiber reinforced resin gear 1 according to this embodiment and results of an endurance test and an abrasion test of conventional products are explained in comparison.

A. Test Products

First Test Product

The first test product is a spur gear formed by molding by injecting polyamide (PA66) which contains 33% weight of glass wool (produced by forming C glass into glass fibers by a centrifugal method) into the inside of a cavity of a mold. The first test product has substantially the same shape as the fiber reinforced resin gear shown in FIGS. 1(a) and 1(b). The first test product is a standard involute spur gear in which module, is set to 1, a pressure angle is set to 20°, and the number of teeth is set to 30.

Figure 2:
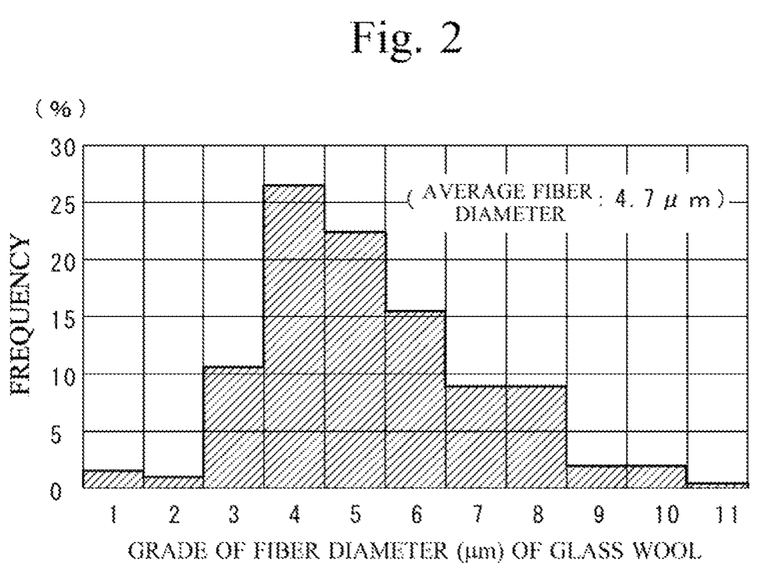
FIG. 2 is a view (histogram) showing a distribution state of a fiber diameter of glass wool used in a first test product.

FIG. 2 is a view (histogram) showing a distribution state of a fiber diameter of glass wool used in the first test product. In FIG. 2, a grade of fiber diameter (μm) of glass wool is taken along an axis of abscissas, and a ratio (%) of an amount of glass wool which belongs to each grade with respect to a total amount of glass wool (a sum of weights of glass wool belonging to the respective grades of 1 to 11) is taken along an as of ordinates. Table 1 described below expresses the relationship between the grades shown in FIG. 2 and the fiber diameter (d).

TABLE 1

| Grade | Fiber diameter (μm) |
| --- | --- |
| 1 | 0 < d ≤ 1 |
| 2 | 1 < d ≤ 2 |
| 3 | 2 < d ≤ 3 |
| 4 | 3 < d ≤ 4 |
| 5 | 4 < d ≤ 5 |
| 6 | 5 < d ≤ 6 |
| 7 | 6 < d ≤ 7 |
| 8 | 7 < d ≤ 8 |
| 9 | 8 < d ≤ 9 |
| 10 | 9 < d ≤ 10 |
| 11 | 10 < d ≤ 11 |

As shown in FIG. 2, with respect to glass wool used in the test product, the fiber diameter was widely scattered within a range of 0.5 to 11 μm, a maximum frequent value of the fiber diameter appeared within a range of 3 to 4 μm, and an average fiber diameter was 4.7 μm (actuary measured value).

Second Test Product

The second test product is a spur gear formed by molding by injecting polyamide (PA66) which contains 43% by weight of glass wool (produced by forming C glass into glass fibers by a centrifugal method) into the inside of a cavity of a mold. The second test product has substantially the same shape as the fiber reinforced resin gear shown in FIGS. 1(a) and 1(b). The second test product is, in the same manner as the first test product, a standard involute spur gear where module is set to 1, a pressure angle is set to 20°, and the number of teeth is set to 30.

Figure 3:
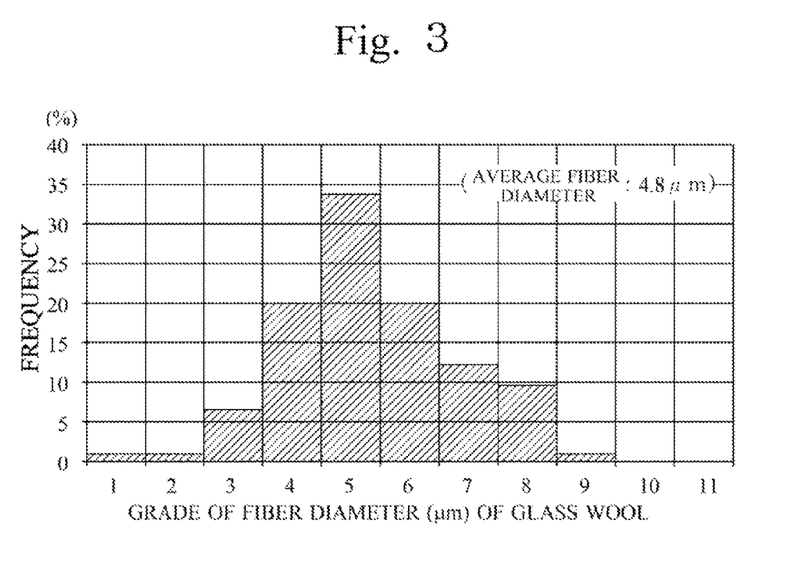
FIG. 3 is a view (histogram) showing a distribution state of a fiber diameter of glass wool used in a second test product.

FIG. 3 is a view (histogram) showing a distribution state of a fiber diameter of glass wool used in the second test product. In FIG. 3, a grade of a fiber diameter (μm) of glass wool is taken along an axis of abscissas, and a ratio (%) of an amount of glass wool which belongs to each grade with respect to a total amount of glass wool (a sum of weights of glass wool belonging to the respective grades of 1 to 11) is taken along an axis of ordinates.

As shown in FIG. 3, with respect to glass wool used in the test product, the fiber diameter was widely scattered within a range of 1 μm or less to 9 μm, a maximum frequent value of the fiber diameter appeared within a range of 4 to 5 μm, and an average fiber diameter was 4.8 μm (actuary measured value).

Third Test Product

The third test product is a spur gear firmed by molding by injecting polyamide (PA66) which contains 33% by weight of glass wool (produced by forming C glass into glass fibers by a centrifugal method) into the inside of a cavity of a mold. The third test product has substantially the same shape as the fiber reinforced resin gear shown in FIGS. 1(a) and 1(b). The third test product is in the same manner as the first test product, a standard involute spur gear in which module is set to 1, a pressure angle is set to 20°, and the number or teeth is set to 30.

Figure 4:
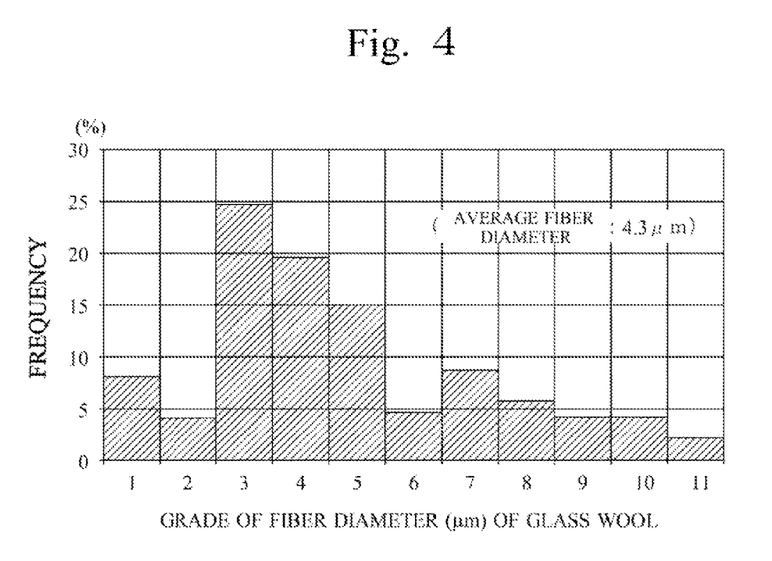
FIG. 4 is a view (histogram) showing a distribution state of a fiber diameter of glass wool used in a third test product.

FIG. 4 is a view (histogram) showing a distribution state of a fiber diameter of glass wool used in the third test product. In FIG. 4, a grade of a fiber diameter (μm) of glass wool is taken along an axis of abscissas, and a ratio (%) of an amount of glass wool which belongs to each grade with respect to a total amount of glass wool to sum of weights of glass wool belonging to the respective grades of 1 to 11) is taken along an axis of ordinates.

As shown in FIG. 4, with respect to glass wool used in the third test product, the fiber diameter was widely scattered within a range of 1 μm or less to 11 μm, a maximum frequent value of the fiber diameter appeared within a range of 2 to 3 μm, and an average fiber diameter was 4.3 μm (actuary measured value).

B. Conventional Products

First Conventional Product

The first conventional product is a spur gear formed by molding by injecting polyamide (PA66) which contains 33% by weight of long glass fibers into the inside of a cavity of a mold. The first conventional product has substantially the same shape as the fiber reinforced resin gear 1 shown in FIGS. 1(a) and 1(b). The first conventional product is, in the same manner as the above-mentioned first test product, a standard involute spur year where module is set to 1 a pressure angle is set to 20°, and the number of teeth is set to 30. In the first conventional product, polyamide (PA66) which contains 33% by weight of long fibers corresponds to Leona (registered, trademark) 1300G of Asahi Kasei corporation. A fiber diameter of the long glass fibers used in the first conventional product was 13 μm (actually measured value).

Second Conventional Product

The second conventional product is a spur gear formed by molding by injecting polyamide (PA66) which contains 43% by weight of long glass fibers into the inside of a cavity of mold. The second conventional product has substantially the same shape as the fiber reinforced resin gear 1 shown in FIGS. 1(a) and 1(b). The second conventional product is, in the same manner as the above-mentioned second test product, a standard involute spur gear where module is set to 1, a pressure angle is set to 20°, and the number of teeth is set to 30. In the second conventional product, polyamide (PA66) which contains 43% by weight of long glass fibers corresponds to Leona (registered trademark) 13G43 of Asahi Kasei corporation. A fiber diameter of the long glass fibers used in the second conventional product was 13 μm (actually measured value).

Third Conventional Product

The third conventional product is a spur gear formed by molding by injecting polyamide (PA66) which contains 33% by weight of long glass fibers into the inside of a cavity of a mold. The third conventional product has substantially the same shape as the fiber reinforced resin gear 1 shown in FIGS. 1(a) and 1(b). The third conventional product is, in the same manner as the above-mentioned third test product, a standard involute spur gear where module is set to 1, a pressure angle is set to 20°, and the number of teeth is set to 30. In the third conventional product, polyamide (PA66) which contains 33% weight of long glass fibers corresponds to Zytel (registered trademark) 70G33L of Du Pont. A fiber diameter of the long glass fibers used in the third conventional product was 10 µm (actually measured value).

C. Durability Test

First Durability Test

The first durability test is performed in a state where a pair of first test products is meshed with each other and a pair of first conventional products is meshed with each other. The durability test was performed until a tooth is broken (ruptures) in a state where a test environment was a high-temperature environment of 130° C., a rotational speed was 250 rpm, a test torque of 1.5 Nm was applied, and grease (Toray•Dow•Corning KK: EM-50L) was applied to a tooth surface. Table 2 shows a result of the first durability test.

TABLE 2

|  | Elapsed time until tooth was broken (hr) | The number of times that gears were meshed with each other |
|---|---|---|
| First test product | 48.8 | 732000 |
| First conventional product | 47.6 | 714000 |

According to the result of the first durability test durability of the first test product under a high temperature environment (130° C.) is enhanced compared to the first conventional product. The result of the first durability test is considered to be acquired due to the following reason. The fiber diameter of the glass wool of the first test product is widely scattered within a range of 0.5 and 11 µm, and glass wool of the first test product largely exists in a scattered manner within a range (0.5 to 4.7 µm) where the fiber diameter is smaller than an average fiber diameter 4.7 µm, and the fiber diameter (0.5 to 11 µm) of glass wool of the first test product is smaller than the fiber diameter (13 µm) of long glass fibers of the first conventional product. Accordingly, when the fiber content of the first test product is equal to the fiber content of the first conventional product, a contact area between glass wool and a base resin (PA66) of the first test product becomes larger than a contact area between long glass fibers and as base resin (PA66) of the first conventional product whereby a reinforcing effect acquired by the fibers (glass wool) of the first test product becomes larger than a reinforcing effect acquired by fibers (long glass fibers) of the first conventional product.

Second Durability Test

The second durability test is performed in a state where as pair of second test products is meshed with each other and a pair of second conventional products is meshed with each other. The second durability test was performed until a tooth was broken (ruptures) in a state where a test environment was a high-temperature environment of 130° C., a rotational speed was 1000 rpm, a test torque of 0.4 Nm was applied, and grease (Toray•Dow•Corning KK: EM-50L) was applied to a tooth surface. Table 3 shows a result of the second durability test.

TABLE 3

|  | Elapsed time until tooth was broken (hr) | The number of times that gears were meshed with each other |
|---|---|---|
| Second test product | 72.8 | 1092000 |
| Second conventional product | 62.5 | 937500 |

According to the result of the second durability test, durability of the second test product under a high temperature environment (130° C.) is enhanced compared to the second conventional product. The result of the second durability test is considered to be acquired due to the following reason. The fiber diameter of the glass wool of the second test product is widely scattered within a range of 1 µm or less to 9 µm, and glass wool of the second test product largely exists in a scattered manner within as fiber diameter range where the fiber diameter is smaller than an average fiber diameter 4.8 µm, and the fiber diameter (1 µm or less to 9 µm) of glass wool of the second test product is smaller than the fiber diameter (13 µm) of long glass fibers of the second conventional product. Accordingly, when the fiber content of the second test product is equal to the fiber content of the second conventional product, a contact area between glass wool and a base resin (PA66) of the second test product becomes larger than a contact area between long glass fibers and a base resin (PA66) of the second conventional product and hence, a reinforcing effect acquired by the fibers (glass wool) of the second test product becomes larger than a reinforcing effect acquired by the fibers (long glass fibers) of the second conventional product.

D. Abrasion Test

First Abrasion Test

The first abrasion test is performed in a state where, in the same manner as the above-mentioned first durability test, a pair of first test products is meshed with each other and a pair of first conventional products is meshed with each other. The first abrasion test was continuously performed for 48 hours (meshing times: $7.2 \times 10^5$ times) in a state where a test environment was a high-temperature environment of 130° C., a rotational speed was 250 rpm, a test torque of 1.5 Nm was applied, and grease (Toray•Dow•Corning KK: EM-50L) was applied to a tooth surface.

Figure 5:
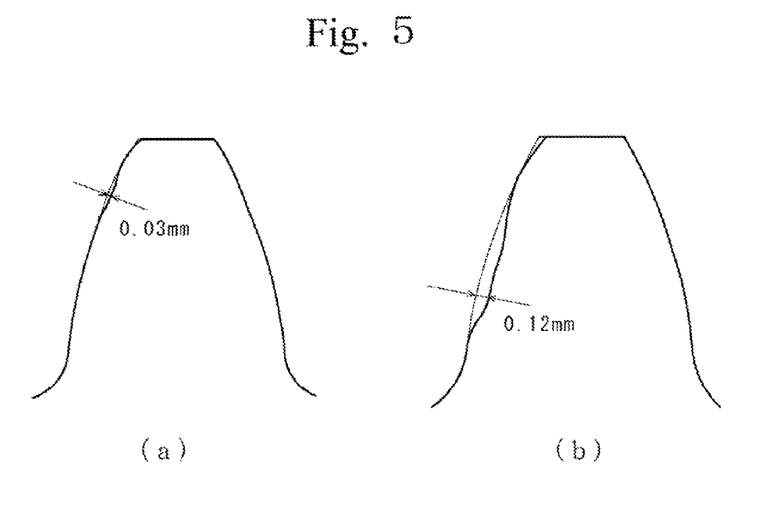
FIG. 5(a) is a view showing an abrasion state of a tooth of the first test product.
FIG. 5(b) is a view showing an abrasion state of a tooth of a first conventional product.

FIG. 5(a) is a view showing an abrasion state of a tooth of the first test product. FIG. 5(b) is a view showing an abrasion state of a tooth of the first conventional product. As shown in FIGS. 5(a) and 5(b), while a maximum abrasion amount of the tooth surface of the first test product is 0.03 mm, a maximum abrasion amount of the tooth surface of the first conventional product is 0.12 mm. That is, an abrasion amount of the tooth of the first test product is smaller than an abrasion amount of the tooth of the first conventional product.

With respect to a change in weight caused by the abrasion of the pair of first test products, the weight of the first test product on a drive side was decreased by 0.011 g, and the weight of the first test product on a drive side was decreased by 0.014 g. On the other hand, with respect to a change in weight caused by the abrasion between the pair of first conventional products, the weight of the first conventional product on a drive side was decreased by 0.042 g, and the weight of the first conventional product on as driven side was decreased by 0.045 g. In this manner, a change in weight caused by the abrasion between the pair of first test products was smaller than a change in weight caused by the abrasion between the pair of first conventional products.

According to the result of the first abrasion test, the first test product is superior to the first conventional product with respect to the abrasion resistance under a high temperature (130° C.) environment. This result of the first abrasion test is considered to be acquired due to the following reason as described in detail in the description of the result of the first durability test. That is, when the fiber content of the first test product and the fiber content of the first conventional product are equal, a contact area between glass wool and a base resin (PA66) of the first test product becomes larger than a contact area between long glass fibers and a base resin (PA66) of the first conventional product and hence, a reinforcing effect acquired by fibers (glass wool) of the first test product becomes larger than a reinforcing effect acquired by fibers (long glass fibers) of the first conventional product. Further, it is considered that the result of the first abrasion test is acquired by the following reason. That is, an average fiber diameter (4.7 μm) of the first test product is smaller than a fiber diameter (13 μm) of long glass fibers of the first conventional product, and glass wool of the first test product largely exists in as scattered manner within a range of fiber diameter (0.5 to 4.7 μm) smaller than the average fiber diameter 4.7 μm and hence, the first test product exhibits a smaller property of attacking as tooth of a meshing counterpart gear than the first conventional product.

Second Abrasion Test

The second abrasion test is performed in as state where, in the same manner as the above-mentioned second durability test, a pair of second test products is meshed with each other and a pair of second conventional products is meshed with each other. The second abrasion test was continuously performed for 48 hours (meshing times: 7.2×10 times) in a state where a test environment was a high-temperature environment of 130° C., a rotational speed was 250 rpm, a test torque of 1.8 Nm was applied, and grease (Toray•Dow•Corning KK: EM-50L) was applied to a tooth surface.

Figure 6:
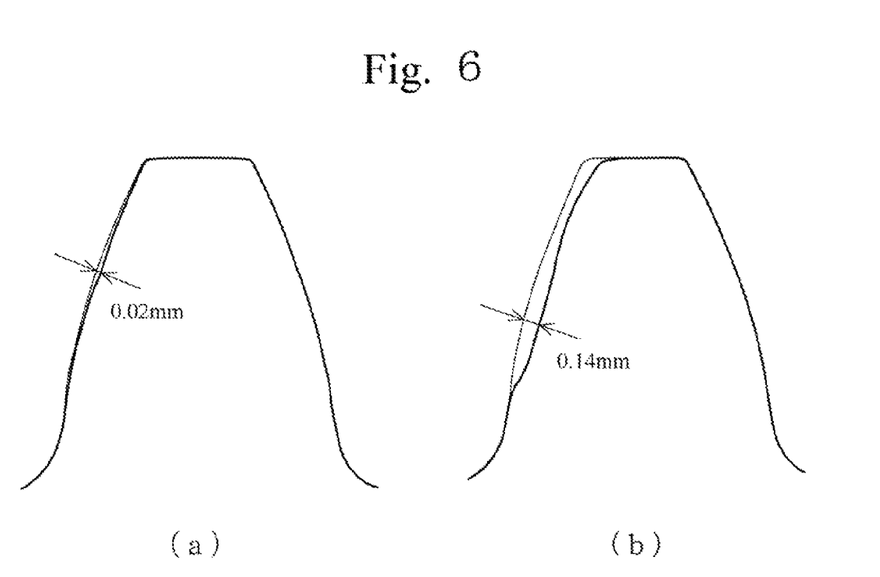
FIG. 6(a) is a view showing an abrasion state of a tooth of the second test product.
FIG. 6(b) is a view showing an abrasion state of a tooth of a second conventional product.

FIG. 6(a) is a view showing an abrasion state of a tooth of the second test product. FIG. 6(b) is a view showing an abrasion state of a tooth of the second conventional product. As shown in FIGS. 6(a) and 6(b), while a maximum abrasion amount of a tooth surface of the second test product was 0.02 mm, a maximum abrasion amount of a tooth surface of the second conventional product was 0.14 mm. That is an abrasion amount of the tooth of the second test product was smaller than an abrasion amount of the tooth of the second conventional product.

With respect to a change in weight caused by the abrasion of the pair of second test products, the weight of the second test product on a drive side was decreased by 0.006 g, and the weight of the second test product on a driven side was decreased by 0.009 g. On the other hand, with respect to a change in weight caused by the abrasion between the pair of second conventional products, the weight of the second conventional product on it drive side was decreased by 0.107 g, and the weight of the second conventional product on a driven side was decreased by 0.110 g. In this manner, a change in weight caused by the abrasion between the pair of second test products was smaller than a change in weight caused by the abrasion between the pair of second conventional products.

According to the result of the second abrasion test, the second test product is superior to the second conventional product with respect to the abrasion resistance under a high temperature (130° C.) environment. This result of the second abrasion test is considered to be acquired due to the following reason as described in detail in the description of the result of the second durability test. That is, when the fiber content of the second test product and the fiber content of the second conventional product are equal, a contact area between glass wool and a base resin (PA66) of the second test product becomes larger than a contact area between long glass fibers and a base resin (PA66) of the second conventional product and hence, a reinforcing effect acquired by fibers (glass wool) of the second test product becomes larger than a reinforcing effect acquired by fibers (long glass fibers) of the second conventional product. Further, it is considered the result of the second abrasion test is considered to be acquired by the following reason. That is, an average fiber diameter (4.8 μm) of the second test product is smaller than a fiber diameter (13 μm) of long glass fibers of the second conventional product, and glass wool of the second test product largely exists in a scattered manner within a range of fiber diameter smaller than the average fiber diameter (4.8 μm) and hence, the second test product exhibits a smaller property of attacking a tooth of a meshing counterpart gear than the second conventional product.

Third Abrasion Test

The third abrasion test is performed in a state where a pair of third test products is meshed with each other and a pair of third conventional products is meshed with each other. The third abrasion test was continuously performed for 48 hours meshing times: 7.2×10⁵ times) in a state where a test environment was a high-temperature environment of 130° C., a rotational speed was 250 rpm a test torque of 1.8 Nm was applied, and grease (Toray•Dow•Corning KK: EM-50L) was applied to a tooth surface.

Figure 7:
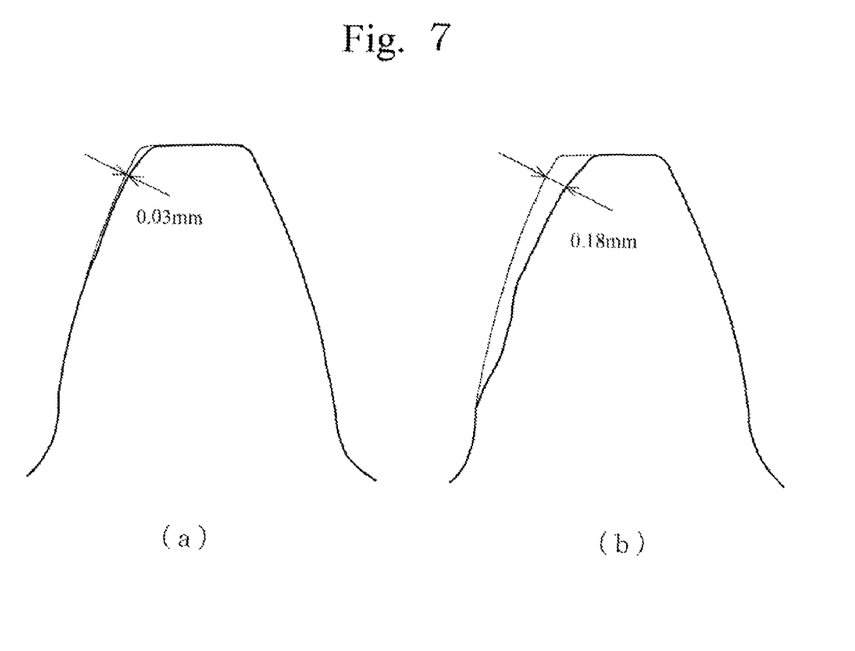
FIG. 7(a) is a view showing an abrasion state of a tooth of the third test product.
FIG. 7(b) is a view showing an abrasion state of a tooth of a third conventional product.

FIG. 7(a) is a view showing an abrasion state of a tooth of the third test product. FIG. 7(b) is a view showing an abrasion state of a tooth of the third conventional product. As shown in FIGS. 7(a) and 7(b), while a maximum abrasion amount of a tooth surface of the third test product was 0.03 mm, a maximum abrasion amount of a tooth surface of the third conventional product was 0.18 mm. That is, an abrasion amount of the tooth of the third test product was smaller bran an abrasion amount of the tooth of the third conventional product.

With respect to a change in weight caused by the abrasion if the pair of third test products, the weight of the third test product on a drive side was decreased by 0.022 g, and the weight of the third test product on a driven side was decreased by 0.022 g. On the other hand, with respect to a change in weight caused by the abrasion between the pair of third conventional products, the weight of the third conventional product on a drive side was decreased by 0.038 g, and the weight of the third conventional product on a driven side was decreased by 0.037 g. In this manner, a change in weight caused by the abrasion between the pair of third test products was smaller than a change in weight caused by the abrasion between the pair of third conventional products.

According to the result of the third abrasion test, the third test product is superior to the third conventional product with respect to the abrasion resistance under a high temperature (130° C.) environment. This result of the third abrasion test is considered to be acquired due to the following reason. That is, when the fiber content of the third test product and the fiber content of the third conventional product are equal, a contact area between glass wool and a base resin (PA66) of the third test product becomes larger than a contact area between long glass fibers and a base resin (PA66) of the third conventional product and hence, as reinforcing effect acquired by fibers (glass wool) of the third test product becomes larger than a reinforcing effect acquired by fibers (long glass fibers) of the third conventional product. Further, it is considered that the result of the third abrasion test is acquired by the following reason. That is, an average, fiber diameter (4.3 μm) of the third test product is smaller than a fiber diameter (10 μm) of long glass fibers of the third conventional product, and glass wool of the third test product largely exists in a scattered manner within a range of fiber diameter smaller than the average fiber diameter (4.3 μm) and hence, the third test product exhibits a smaller property of attacking a tooth of a meshing counterpart gear than the third conventional product.

The fiber reinforced resin gear 1 according to the present invention is not limited to the spur gear exemplified in the above-mentioned embodiment, and is applicable to at helical gear, a herringbone gear, a worm wheel, a bevel gear, a Face gear, a rack and the like.

The fiber reinforced resin gear 1 according to the present invention is not limited to the spur gear having the shape shown in FIGS. 1(a) and 1(b), and is applicable to spur gears having various shapes.

The fiber reinforced resin gear 1 according to the present invention uses glass wool produced by forming C glass or F glass into glass fibers by a centrifugal method. In this case, it is preferable that the fiber reinforced resin gear 1 according to the present invention use glass wool produced by forming C glass into glass fibers by a centrifugal method. This is because that glass wool produced by forming C glass into glass fibers by a centrifugal method exhibits low elasticity compared to glass wool produced by forming E glass into glass fibers by a centrifugal method so that the glass wool produced by forming C glass into glass fibers by a centrifugal method exhibits a low property of attacking a tooth or a meshing counterpart gear (fiber reinforced resin gear 1) compared to glass wool produced by forming E glass into glass fibers by a centrifugal method.

Further, in the fiber reinforced resin gear 1 according to the present invention, the content of glass wool with respect to a base resin is set to a value which falls within a range of 10 to 50% by weight, and an optimum content ratio of glass wool is determined corresponding to conditions of the use. In the fiber reinforced resin gear 1 according to the present invention, it is preferable that the content of glass wool is set to a value which falls within a range of 20 to 50% by weight, and it is more preferable that the content of glass wool is set to a value which falls within a range of 30 to 50% by weight.

REFERENCE SIGNS LIST

1: fiber reinforced resin gear

The invention claimed is:

1. A fiber reinforced resin gear, comprising:
a gear body comprising a plurality of teeth,
said gear body comprising a resin material and a plurality of glass wool fibers,
said gear body formed by injecting a resin material containing glass wool fibers into the inside of a cavity of a mold,
wherein a fiber diameter of the glass wool fibers is in a range of 0.1 to 15 μm, and is distributed such that a most frequent value of the fiber diameter appears within a range of 2 to 5 μm, and an average fiber diameter of the glass wool falls within a range of 3 to 5 μm.

2. The fiber reinforced resin gear according to claim 1, wherein the fiber diameter of the glass wool fibers is within a range of 0.5 to 11 μm.

3. The fiber reinforced resin gear according to claim 1, wherein the average fiber diameter of the glass wool fibers is within a range of 4 to 5 μm.

4. The fiber reinforced resin gear according to claim 1, wherein the resin material is a thermoplastic resin.

5. The fiber reinforced resin gear according to claim 4, wherein the thermoplastic resin is polyamide (PA), polyacetal (POM), polyphenylene sulfide (PPS), polyphthalamide (PPA), polyetherimide, polyethersulfone, polyketone, polyetheretherketone, polysulfone, polyphenylene ether, polyimide, polyamide-imide, or phenoxy.

6. The fiber reinforced resin gear according to claim 4, wherein the thermoplastic resin is polyamide (PA), polyacetal (POM), polyphenylene sulfide (PPS), or polyphthalamide (PPA).

7. The fiber reinforced resin gear according to claim 1, wherein the content of the glass wool fibers to the resin material in a range of 10 to 50% by weight.

8. The fiber reinforced resin gear according to claim 1, wherein the content of the glass wool fibers to the resin material in a range of 20 to 50% by weight.

9. The fiber reinforced resin gear according to claim 1, wherein the content of the glass wool fibers to the resin material in a range of 30 to 50% by weight.

10. The fiber reinforced resin gear according to claim 1, wherein the glass wool fibers are produced from C glass or E glass.

* * * * *